No. 761,851. PATENTED JUNE 7, 1904.
P. W. SCHWAB.
SEED AGITATING DEVICE FOR DRILLS.
APPLICATION FILED FEB. 12, 1904.
NO MODEL. 2 SHEETS—SHEET 1.
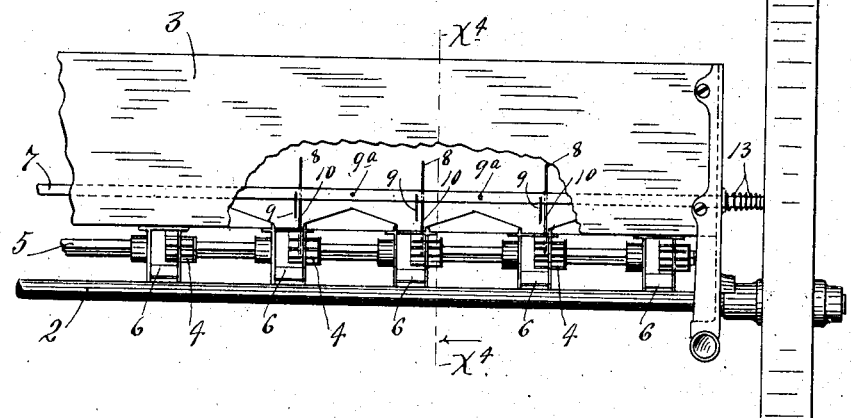
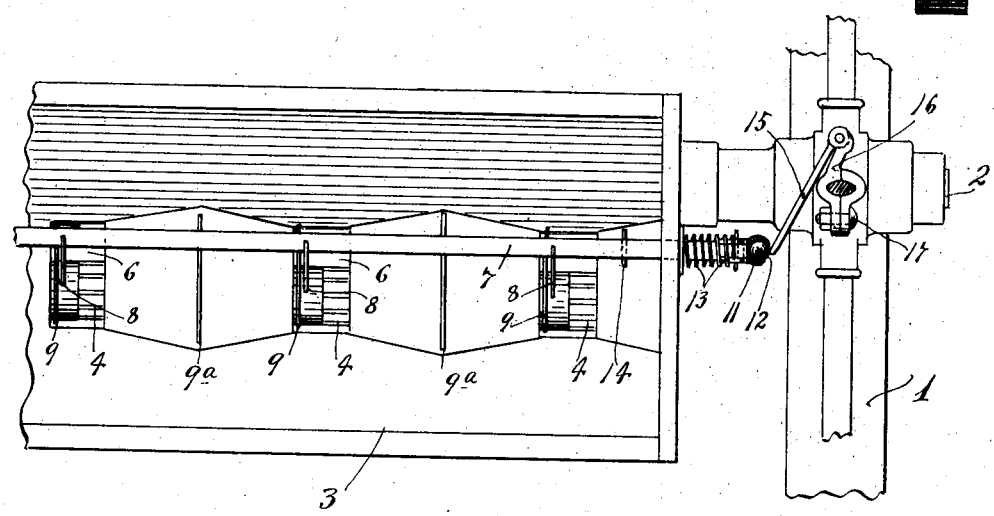
Witnesses
A. H. Opsahl.
H. S. Kilgore
Inventor.
Peter W. Schwab.
By his Attorneys.
Williamson & Merchant

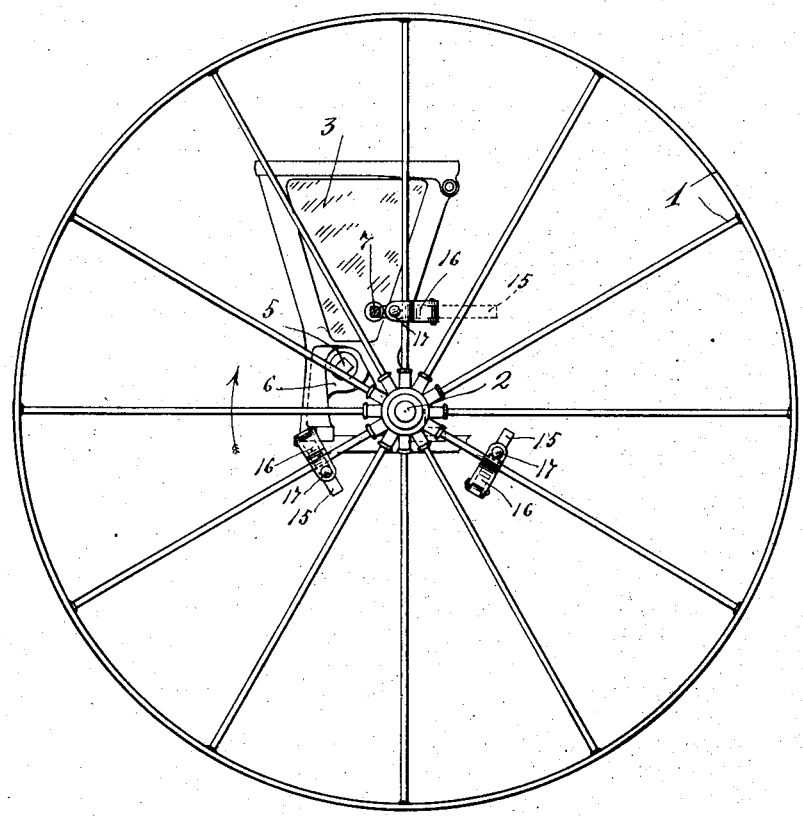
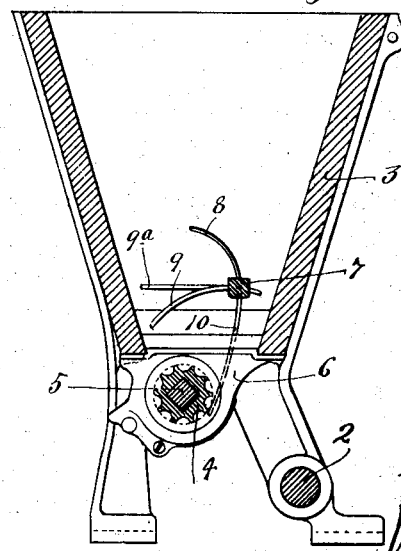

No. 761,851.

Patented June 7, 1904.

UNITED STATES PATENT OFFICE.

PETER W. SCHWAB, OF ST. LOUIS PARK, MINNESOTA, ASSIGNOR TO MONITOR DRILL COMPANY, OF ST. LOUIS PARK, MINNESOTA, A CORPORATION OF MINNESOTA.

SEED-AGITATING DEVICE FOR DRILLS.

SPECIFICATION forming part of Letters Patent No. 761,851, dated June 7, 1904.

Application filed February 12, 1904. Serial No. 193,229. (No model.)

*To all whom it may concern:*

Be it known that I, PETER W. SCHWAB, a citizen of the United States, residing at St. Louis Park, in the county of Hennepin and State of Minnesota, have invented certain new and useful Improvements in Seed-Agitating Devices for Drills; and I do hereby declare the following to be a full, clear, and exact description of the invention, such as will enable others skilled in the art to which it appertains to make and use the same.

My present invention has for its object to provide an improved device for agitating and stirring up the seed or grain within the seed box or hopper of a grain-drill; and to this end it consists of the novel devices and combinations of devices hereinafter described and defined in the claims.

The invention is illustrated in the accompanying drawings, wherein like characters indicate like parts throughout the several views.

Figure 1 is a view in rear elevation with some parts broken away, showing part of a grain-drill having applied thereto my improved agitating device. Fig. 2 is a view, principally in plan, with some parts sectioned and others broken away, showing the parts illustrated in Fig. 1. Fig. 3 is a side elevation of the parts shown in Fig. 1 looking at the same from the right toward the left; and Fig. 4 is a transverse vertical section on the line $x^4$ $x^4$ of Fig. 1, some parts being removed.

The numeral 1 indicates one of the wheels, the numeral 2 the axle, the numeral 3 the seed box or hopper, and the numeral 4 the corrugated or grooved seed-discharging cylinders of an ordinary grain-drill. The plurality of seed-discharging cylinders 4 are driven in the usual way directly by an angular shaft 5, which in turn is rotated in the usual or any suitable way and by means forming no part of this invention. Seed-cups 6, which communicate with the bottom of the hopper 3 in the usual way, inclose the respective feed-cylinders 4 and coöperating parts.

In carrying out my invention I preferably run a long thrust-rod 7 transversely of the machine and longitudinally of and through the lower portion of the hopper or box 3, said thrust-rod being provided with suitable bearings in the ends of the said box or hopper. Within the hopper 3 the thrust-rod 7 is provided with a plurality of sets of agitating-fingers 8, 9, $9^a$, and 10. There are as many sets of these fingers as there are cups 6, and one of the agitating-fingers 10 depends into each cup 6, with its lower end terminating very close to the corresponding feed-cylinder 4. The agitating-fingers 8, 9, and $9^a$ all project within the hopper 3; but one of the fingers 9 quite closely overlies each of the said feed-cylinders 4. At its projecting right-hand end the thrust-rod 7 is preferably provided with a socket-like head 11, which holds an antifriction-ball 12, the outer portion of which is exposed. A coiled spring 13 on the outer end of the thrust-rod 7 is compressed between the head 11 and the adjacent end of the hopper 3 and tends to hold said thrust-rod in an extreme position toward the right, movement in that direction being limited by a suitable stop, shown as afforded by a pin 14 on said rod, which engages with the right-hand end of the hopper 3. To intermittently vibrate the thrust-rod 7 toward the left, I pivot a cam-plate 15 to a bracket 16, which is carried by the wheel 1. As shown, this bracket 16 is a divided bracket and is detachably clamped by a bolt 17 to one of the spokes of the said wheel 1 in position to engage the ball 12 under each rotation of the wheel 1 in the direction indicated by the arrow marked on Fig. 3. In Fig. 2 the said cam-plate is shown as thus engaged with the said ball 12, so as to force the thrust-rod 7 against the tension of the spring 13 into its extreme position toward the left, and it is of course evident that as soon as the said cam-plate passes forward out of engagement with the said ball the spring 13 will be released and will throw the thrust-rod 7 and its agitating-fingers violently toward the right and that this movement of the said rod will be brought to a sudden stop by the engagement of the collar 14 with the adjacent end of the hopper. This sudden stoppage of the movement of the agitating-rod produces a jar or vibration which is highly efficient in stirring or loosening up the grain or seed in the lower portion of the hopper and in the several cups thereof. With reference to Fig. 2 it will be noted that when the cam-plate 15 is thrown into action on the ball 12 it engages as a stop with the hub of the bracket 16, and it will of course be understood that as the said cam-plate is carried upward into a position for action on the said ball it will by gravity fall backward into engagement with the hub of the bracket. It is also evident that when the machine is run backward the said cam-plate will freely swing forward into the position indicated by dotted lines in Fig. 3, and hence will not operate upon the said ball.

In the illustration given in the drawings I have shown the wheel as provided with three supporting-brackets 16 and a corresponding number of pivoted cam-plates 15, so that the thrust-rod 7 will be acted upon three times under each rotation of the wheel.

By actual use of the seed-agitating device above described I have demonstrated its efficiency.

From what has been said it will of course be understood that the device described is capable of modification within the scope of my invention as herein set forth and claimed.

What I claim, and desire to secure by Letters Patent of the United States, is as follows:

1. In a machine of the character described, the combination with a seed-hopper and feed devices for delivering the grain therefrom, of an agitating device comprising an endwise-movable agitating-rod, provided with agitating-fingers located within said hopper, a positive stop intercepting the movement of the rod in one direction, a spring tending to maintain engagement between said rod and stop, and a wheel-driven cam-plate arranged to intermittently act upon said rod to move the same against its spring, and then suddenly release the same, and permit said spring to throw the said rod against the said stop, substantially as described.

2. In a machine of the character described, the combination with a feed-hopper having a plurality of cups and seed-discharging devices within said cups, of a thrust-rod having a plurality of agitating-fingers working within said hopper and within the cups thereof, a spring yieldingly forcing said thrust-rod in one direction against a stop, and a pivoted cam-plate carried by one of the wheels and operating on the projecting end of said rod to force the same, against the spring and then suddenly release the same and which cam-plate under backward movement of the wheel turns into an inoperative position, substantially as described.

3. In a machine of the character described, the combination with a seed-hopper having a plurality of cups and a plurality of seed-discharging devices working within said cups, of a thrust-rod having a plurality of agitating-fingers working within said hopper and within the cups thereof, a spring forcing said rod in one direction against a stop, an antifriction device mounted in the projecting end of said thrust-rod, and a cam-plate carried by one of the wheels and intermittently engageable with said antifriction device of said thrust-rod, to move said thrust-rod against the tension of its spring and then suddenly release the same, substantially as described.

In testimony whereof I affix my signature in presence of two witnesses.

PETER W. SCHWAB.

Witnesses:
   LOUIS W. FULLER,
   E. R. HAYES.